(12) United States Patent
Ju et al.

(10) Patent No.: US 7,983,676 B2
(45) Date of Patent: Jul. 19, 2011

(54) INTER-SYSTEM HANDOVER

(75) Inventors: Jae-Young Ju, Gyeonggi-do (KR);
Young-Ho Joo, Gyeonggi-do (KR);
Hyun-Wook Kim, Gyeonggi-do (KR);
Young-Lak Kim, Gyeonggi-do (KR)

(73) Assignee: SK Telecom Co., Ltd., Seoul (KR)

( * ) Notice: Subject to any disclaimer, the term of this patent is extended or adjusted under 35 U.S.C. 154(b) by 705 days.

(21) Appl. No.: 10/592,341

(22) PCT Filed: Mar. 10, 2005

(86) PCT No.: PCT/KR2005/000676
§ 371 (c)(1),
(2), (4) Date: Jun. 13, 2008

(87) PCT Pub. No.: WO2005/112306
PCT Pub. Date: Nov. 24, 2005

(65) Prior Publication Data
US 2008/0242304 A1    Oct. 2, 2008

(30) Foreign Application Priority Data

Mar. 10, 2004  (KR) .................. 10-2004-0016135
Mar. 10, 2004  (KR) .................. 10-2004-0016286
Mar. 10, 2004  (KR) .................. 10-2004-0016294

(51) Int. Cl.
*H04W 36/00*   (2009.01)

(52) U.S. Cl. .................. 455/439; 455/432.1; 455/435.2; 455/436; 455/437; 455/438; 455/440; 455/441; 455/442; 455/443; 370/310.2; 370/328; 370/331

(58) Field of Classification Search ............... 455/432.1, 455/435.1, 435.2, 436–444; 370/331–334, 370/310.2, 328
See application file for complete search history.

(56) References Cited

U.S. PATENT DOCUMENTS
5,930,714 A * 7/1999 Abu-Amara et al. ......... 455/442
(Continued)

FOREIGN PATENT DOCUMENTS
EP       1014737 A2    6/2000
(Continued)

OTHER PUBLICATIONS

International Search Report, together with Written Opinion, corresponding to PCT/KR2005/000676, under date of mailing of Jul. 29, 2005.

(Continued)

*Primary Examiner* — Stephen M D'Agosta
(74) *Attorney, Agent, or Firm* — Lowe Hauptman Ham & Berner LLP

(57) ABSTRACT

A method of handover in a wireless communication system in which an asynchronous system and a synchronous system are mixed is disclosed. The method comprises the steps of: the asynchronous system ordering a dual mode mobile terminal to perform a handover from the asynchronous system to the synchronous system; when the handover order is received at the mobile terminal, the mobile terminal transmitting a frame or a preamble through a reverse traffic channel to the synchronous system, reporting to the synchronous system that the handover is completed and initiating a timer of the mobile terminal which is set according to a predetermined time; the mobile terminal switching from an asynchronous vocoder into a synchronous vocoder when the timer expires; and the wireless communication system switching vocoders of asynchronous and synchronous MSCs when the report is received.

24 Claims, 8 Drawing Sheets

U.S. PATENT DOCUMENTS

| | | | |
|---|---|---|---|
| 6,243,590 B1 | 6/2001 | Reddy et al. | |
| 6,246,673 B1 * | 6/2001 | Tiedemann et al. | 370/333 |
| 6,920,324 B2 * | 7/2005 | Atarius et al. | 455/436 |
| 6,982,971 B2 * | 1/2006 | Tiedemann et al. | 370/333 |
| 7,151,756 B1 * | 12/2006 | Park et al. | 370/331 |
| 7,257,403 B2 * | 8/2007 | Nikkelen | 455/436 |
| 7,336,951 B2 * | 2/2008 | Choi et al. | 455/436 |
| 2002/0085517 A1 * | 7/2002 | Lee et al. | 370/331 |

FOREIGN PATENT DOCUMENTS

| | | |
|---|---|---|
| JP | 2000-224639 | 8/2000 |
| JP | 2000-232672 | 8/2000 |
| JP | 2001-186552 | 7/2001 |
| JP | 2001-197539 | 7/2001 |
| JP | 2001-359134 | 12/2001 |
| JP | 2005-244855 | 9/2005 |
| KR | 2005-48192 A | 5/2005 |
| WO | 95/33348 | 12/1995 |

OTHER PUBLICATIONS

Japanese Office Action for application No. 2007-502718, citing the above reference(s).

* cited by examiner

INTER-SYSTEM HANDOVER

TECHNICAL FIELD

The present invention relates to a method of handover between different types of mobile communication systems, and in particular, to a method of handover in a wireless communication network in which an asynchronous system and a synchronous system co-exist.

BACKGROUND ART

The current mobile communication network has a format in which a synchronous mobile communication system (CDMA mobile communication system) called 2G or 2.5 G communication networks and an asynchronous mobile communication system (WCDMA mobile communication system) called 3 G communication network co-exist.

As such mobile communication network technology has advanced, a dual band and dual mode terminal (DBDM), which can be used in both the synchronous system and the asynchronous system, is being currently developed, and such mobile terminal allows the use of different modes of services in both the asynchronous system area and the synchronous system area. The DBDM mobile terminal comprises an antenna, a synchronous modem that is a module for a synchronous mobile communication service, an asynchronous modem that is a module for an asynchronous mobile communication service, and a common module.

Since the asynchronous mobile communication system is at an initial stage of services and needs massive investment costs to implement the system, it cannot provide coverage over a wide area, so it is implemented in the form of overlap with the synchronous mobile communication system area. Since the service coverage area of the asynchronous mobile communication system is limited, if a subscriber of the asynchronous mobile communication system, who is using the service in the asynchronous service area, moves to the synchronous service area where the asynchronous mobile communication service is not provided, a handover is needed to provide a continuous service to the subscriber.

Currently, a variety of handover methods are being studied for a terminal which moves from the asynchronous mobile communication system to the synchronous mobile communication system. During such a handover of a mobile terminal, the mobile terminal must switch an asynchronous vocoder, which is used for a voice call with the asynchronous communication system, to a synchronous vocoder, which is used for a voice call with the synchronous communication system, and both the asynchronous and synchronous communication systems require a vocoder switching process. Accordingly, both the mobile terminal and the mobile communication system can conduct a voice call after the vocoders are switched.

However, since there exists a gap between the timing of switching the vocoder of the mobile terminal and the timing of switching the vocoder of the mobile communication system, a silent period occurs during handover, and thereby the service quality is degraded.

DISCLOSURE OF INVENTION

Technical Solution

An object of the present invention is to provide a handover method in a mobile communication network in which different modes of mobile communication systems co-exist.

Another object of the present invention is to provide a handover method capable of minimizing a silent period during handover between different modes of mobile communication systems.

Yet another object of the present invention is to provide a handover method from an asynchronous mobile communication system to a synchronous mobile communication system.

According to a first aspect of the present invention for achieving the above-described objects, a handover method of a dual mode mobile communication system during call from an asynchronous mobile communication system to a synchronous mobile communication system comprises the steps of: said asynchronous mobile communication system requesting a handover to said synchronous mobile communication system according to a handover request of said mobile terminal; said synchronous mobile communication system assigning a forward traffic channel to said mobile terminal, and transmitting a response message with respect to said handover request to said asynchronous mobile communication system; said asynchronous mobile communication system instructing a handover to said mobile terminal; when said handover instruction is received, said mobile terminal transmitting a frame or a preamble to said synchronous mobile communication system through a reverse traffic channel, reporting to said synchronous mobile communication system that the handover has been completed, and actuating a timer which is set to a predetermined time; said mobile terminal switching a vocoder when the setting time of said timer has expired; and when the handover completion report is received from said mobile terminal, said synchronous mobile communication system reporting to said asynchronous mobile communication system that the handover of said mobile terminal has been completed, and switching vocoders between an asynchronous switching center and a synchronous switching center.

Preferably, the asynchronous mobile communication system requests a handoff based on a handover-related message used in the synchronous mobile communication system and a parameter including a neighbor cell information, a neighbor base station information, a handover type, a handover cause, a source base station controller ID, a target base station controller ID, an RAB information and a radio section-related information of said mobile terminal.

Preferably, said method further comprises the step of said asynchronous mobile communication system determining whether the handover request of said mobile terminal is a handover in the asynchronous communication system or a handover to the synchronous mobile communication system, with reference to the neighbor cell information and the neighbor base station information of the mobile terminal.

Also preferably, the handover request from the asynchronous mobile communication system to the synchronous mobile communication system includes an asynchronous identification number (MSISDN) of the mobile terminal. Also, the handover request message sent from the asynchronous switching center to the synchronous switching center includes at least one among a billing ID, ESN, an internal switching center circuit ID and a MIN parameter, and the response message of the synchronous mobile communication system with respect to the handover request includes a CDMA channel data parameter or a CDMA channel list parameter.

According to a second aspect of the present invention, in a mobile communication system wherein an asynchronous mobile communication system and a synchronous mobile communication system co-exist, the handover method for minimizing a silent period during a voice call of a dual band dual mode mobile terminal, which can communicate with the asynchronous mobile communication system and the synchronous mobile communication system, comprises the steps of: said asynchronous mobile communication system requesting a handover to said synchronous mobile communication system according to a handover request of said mobile terminal; said base station/base station controller of said synchronous mobile communication system assigning a forward traffic channel to said mobile terminal, and transmitting a response message with respect to said handover request to said asynchronous mobile communication system; said synchronous switching center transmitting a response message with respect to the handover request to said asynchronous switching center so that a trunk is set between said asynchronous switching center and said synchronous switching center; said asynchronous switching center reporting to a radio network controller of said asynchronous mobile communication system that the assigning of resources for the handover has been completed; said radio network controller instructing a handover to said mobile terminal through said node B to switch said mobile terminal to a synchronous mobile communication system connection mode; said mobile terminal transmitting a frame or a preamble to said base station/base station controller through a reverse traffic channel and reporting that the handover has been completed; said mobile communication system actuating a timer as the connection to the synchronous mobile communication system has been completed; said base station/base station controller reporting the completion of the handover to said asynchronous switching center through said synchronous switching center; said mobile terminal completing the actuation of the timer and switching the vocoder; switching vocoders between said asynchronous switching center and said synchronous switching center; and releasing the connection between said asynchronous switching center and said node B/radio network controller.

Preferably, the step of releasing the connection between said asynchronous mobile communication system and said synchronous mobile communication system comprises the steps of: said asynchronous switching center requesting a connection release to said node B/radio network controller, and said asynchronous switching center receiving the completion of the connection release from said node B/radio network controller.

Preferably, the step of said radio network controller transmitting a handover request message to said asynchronous switching center includes a handover-related message used in said synchronous communication system and a parameter including a neighbor cell information, a neighbor base station information, a handover type, a handover cause, a source base station controller ID, a target base station controller ID, an RAB information, and radio section-related information of said mobile terminal.

Also preferably, said method further comprises the step of determining whether said asynchronous switching center is a handover in an asynchronous mobile communication system or a handover to a synchronous mobile communication system, with reference to the neighbor cell information and the neighbor base station information of the mobile terminal.

Also preferably, the handover request message from the asynchronous switching center to the synchronous switching center includes an asynchronous identification number (MSISDN) of the mobile terminal, and transmits a billing ID including the ID information of the synchronous switching center to be connected with the asynchronous switching center and an internal switching center circuit ID for each handover interval before transmitting the handover request message. In addition, the handover request message includes a parameter including a billing ID, ESN, an internal switching center circuit ID, MIN, and the response message, which the synchronous switching center transmits to the asynchronous switching center, includes a parameter including CDMA channel data and CDMA channel list. In addition, the resource assignment completion message includes a message type, an RRC container, and an RAB list to be released.

Preferably, after the step of the connection between the asynchronous switching center and the node B/radio network controller being released, as a call release request is received from an incoming or originating mobile terminal, an switching center, which received the call release request, transmits the call release request message to a corresponding switching center, and as the corresponding switching center responds thereto, the trunk which is set between the asynchronous switching center and the synchronous switching center is released.

According to a third aspect of the present invention, in a mobile communication system in which an asynchronous mobile communication system and a synchronous mobile communication system co-exist and in which said asynchronous mobile communication system and said synchronous mobile communication system are connected by an interworking/interoperability function unit, the handover method for minimizing a silent period during a voice call of a mobile terminal of dual band dual mode which can communicate with the asynchronous mobile communication system and the synchronous mobile communication system comprises the steps of: said asynchronous switching center transmitting a handover request message to said interworking/interoperability function unit, and said interworking/interoperability function unit requesting said dual stack home location register to transmit the subscriber information of said mobile terminal and receiving said subscriber information; said interworking/interoperability function unit instructing a handover to said synchronous switching center, and said synchronous switching center requesting a handover to said base station controller/base station; said base station/base station controller assigning a forward traffic channel to said mobile terminal, and transmitting a response message with respect to the handover request to said synchronous switching center; said synchronous switching center transmitting a response message with respect to the handover instruction to said interworking/interoperability function unit, and said interworking/interoperability function unit transmitting a response message with respect to the handover request to said asynchronous switching center, so that a trunk is set between said asynchronous switching center and said synchronous switching center; said asynchronous switching center reporting to said radio network controller that the resource assignment for handover has been completed; said radio network controller instructing a handover to said mobile terminal through said node B to switch said mobile terminal to a synchronous mobile communication system connection mode; said interworking/interoperability function unit transmitting an access signal to said asynchronous switching center; said mobile terminal transmitting a frame and a preamble to said base station/base station controller through a reverse traffic channel, and reporting that the handover has been completed; said mobile terminal actuating a timer as the connection with said synchronous mobile communication has been completed; said base station/base station controller reporting to said switching center that the handover has been completed, and said switching center notifying to said interworking/interoperability function unit that the handover has been completed; said mobile terminal terminating the actuation of the timer and switching a vocoder; switching vocoders between said asynchronous switching center and said synchronous switching center; and releasing the connection between said asynchronous switching center and said node B/radio network controller.

Preferably, said handover request message includes a handover-related message used in said synchronous mobile communication system and a parameter including a neighbor cell information of said mobile terminal, a neighbor base station information of said mobile terminal, a handover type, a source base station controller ID, a target base station controller ID, an RAB information, and a radio section-related information.

Preferably, said method further comprises the step of determining whether said asynchronous switching center is a handover in an asynchronous mobile communication system or a handover in a synchronous mobile communication system, based on the neighbor cell information and a neighbor base station information of said mobile terminal.

Also preferably, the subscriber information, which said interworking/interoperability function unit receives from said dual stack home location register, includes synchronous identifiers (MIN, ESN) of said mobile terminal. In addition, the step of said interworking/interoperability function unit requesting the subscriber information of said mobile terminal to said dual stack home location register uses any one of either a synchronous message or an asynchronous message. Also preferably, before transmitting a handover instruction message to said synchronous switching center, said interworking/interoperability function unit generates the ID information of a synchronous switching center to be connected to said asynchronous switching center to include the ID information into the handover instruction message, and transmits the handover instruction message including an internal switching center circuit ID (InterMSCCircuitID) for each handover interval.

Preferably, the handover request message, which said interworking/interoperability function unit transmits to said synchronous switching center, includes a parameter including a billing ID, ESN, an internal switching center circuit ID and MIN, and the response message, which said synchronous switching center transmits to said interworking/interoperability function unit, includes a parameter including CDMA channel data and a CDMA channel list.

In addition, said resource assignment completion message includes a message type, an RRC container, and an RAB list to be released. Also, said access signal includes an invoke ID, an application protocol data unit (APDU), and a selected wireless resource information.

Preferably, after the step of the connection between said asynchronous switching center and said node B/radio network controller being released, as a call release request is received from an incoming or originating mobile terminal, an switching center, which received the call release request, transmits a call release request message to said interworking/interoperability function unit, and said interworking/interoperability function unit responds thereto so that a trunk, which is set between said asynchronous switching center and said synchronous switching center, is released. More preferably, said call release request message includes a parameter including an internal MSC circuit ID, release causes, a billing ID and MIN, and said response message includes a billing ID.

According to a fourth aspect of the present invention, in a mobile communication system in which an asynchronous mobile communication system and a synchronous mobile communication system are mixed and in which said asynchronous mobile communication system and said synchronous mobile communication system are connected by an interworking/interoperability function unit, the handover method for minimizing a silent period during a voice call of a mobile terminal of dual band dual mode which can communicate with the asynchronous mobile communication system and the synchronous mobile communication system comprises the steps of: said asynchronous switching center transmitting a handover request message to said interworking/interoperability function unit, and said interworking/interoperability function unit transmitting said dual stack home location register to transmit the subscriber information of said mobile terminal and receiving the subscriber information; said interworking/interoperability function unit instructing a handover to said synchronous switching center, and said synchronous switching center requesting a handover to said base station controller/base station; said base station/base station controller assigning a forward traffic channel to said mobile terminal, and transmitting a response message with respect to the handover request to said synchronous switching center; said synchronous switching center transmitting a response message with respect to the handover instruction to said interworking/interoperability function unit, and said interworking/interoperability function unit transmitting a response message with respect to the handover request to said asynchronous switching center, so that a trunk is set between said asynchronous switching center and said synchronous switching center; said asynchronous switching center transmitting an initial address message to said interworking/interoperability function unit and receiving a response thereto so that a trunk is set between said asynchronous switching center and said synchronous switching center; said asynchronous switching center reporting to said radio network controller that the resource assignment has been completed; said radio network controller instructing a handover to said mobile terminal through said node B so that said mobile terminal is switched to a synchronous mobile communication system connection mode; said interworking/interoperability function unit transmitting an access signal to said asynchronous switching center; said mobile terminal transmitting a frame or a preamble to said base station/base station controller through a reverse traffic channel, and reporting that the handover has been completed; said mobile terminal actuating a timer as the connection to said synchronous mobile communication system has been completed; said base station/base station controller reporting to said switching center that the handover has been completed, and said switching center reporting to said interworking/interoperability function unit that the handover has been completed; said mobile terminal terminating the actuation of the timer and switching a vocoder; switching vocoders between said asynchronous switching center and said synchronous switching center; and releasing the connection between said asynchronous switching center and said node B/radio network controller.

Preferably, the step of setting a trunk between said asynchronous switching center and said synchronous switching center is implemented in such a manner that said asynchronous switching center transmits an initial address message (IAM) being an ISUP message to said interworking/interoperability function unit, and said interworking/interoperability function unit transmits an address complete message being an ISUP message to said asynchronous switching center. In addition, preferably, said step of releasing the connection between said asynchronous switching center and said node B/radio network controller comprises the steps of: said interworking/interoperability function unit requesting said asynchronous switching center, and reporting that said switching center and said mobile terminal have been connected to each other by using the ISUP message; and the connection between said asynchronous switching center and said node B/radio network controller being released.

Also preferably, after the step of releasing the connection between said asynchronous switching center and said node B/radio network controller, said method further comprises the steps of: releasing a call between said asynchronous switching center and said synchronous switching center as the mobile terminal in the asynchronous mobile communication system area releases a call; releasing a trunk between said asynchronous switching center and said synchronous switching center; and as said asynchronous switching center reports to said interworking/interoperability function unit that the connection release has been completed, said interworking/interoperability function unit transmitting a call release request message to said synchronous switching center; and said synchronous switching center responding to said call release request message so that said trunk is released.

More preferably, said call release request message includes a parameter including an internal MSC circuit ID, release causes, a billing ID and MIN, and said response message includes a parameter including a billing ID.

Advantageous Effects

The present invention can minimize a silent period by bringing the timing of switching vocoders to coincide between a mobile terminal and different modes of mobile communication systems during handover therebetween.

BEST MODE FOR CARRYING OUT THE INVENTION

The invention will be specifically described with reference to the exemplary embodiments.

First Embodiment

Figure 1:
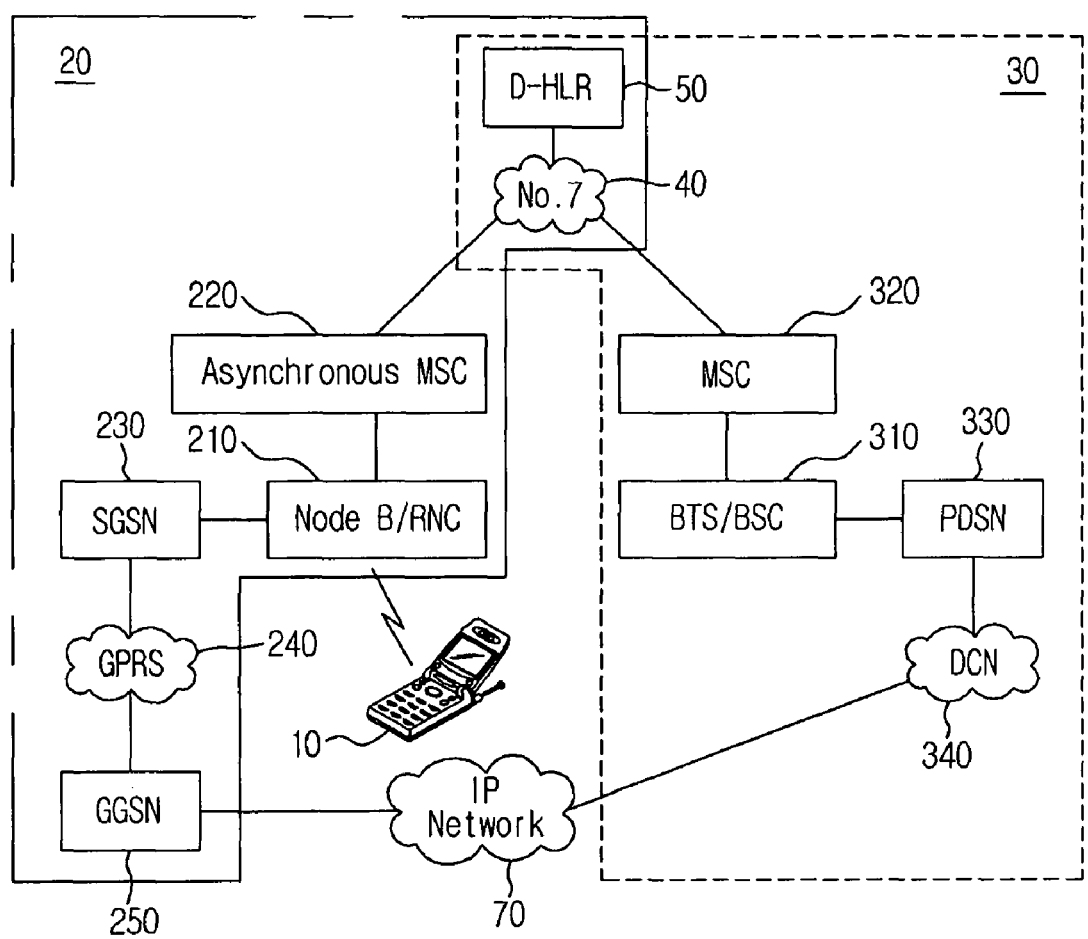
FIG. 1 is a diagram showing one embodiment of a mobile communication network, to which the present invention is applied and in which an asynchronous mobile communication system and a synchronous mobile communication system co-exist.

FIG. 1 shows one embodiment of a mobile communication network to which the present invention is applied and in which an asynchronous mobile communication system and a synchronous mobile communication system co-exist.

Figure 2:
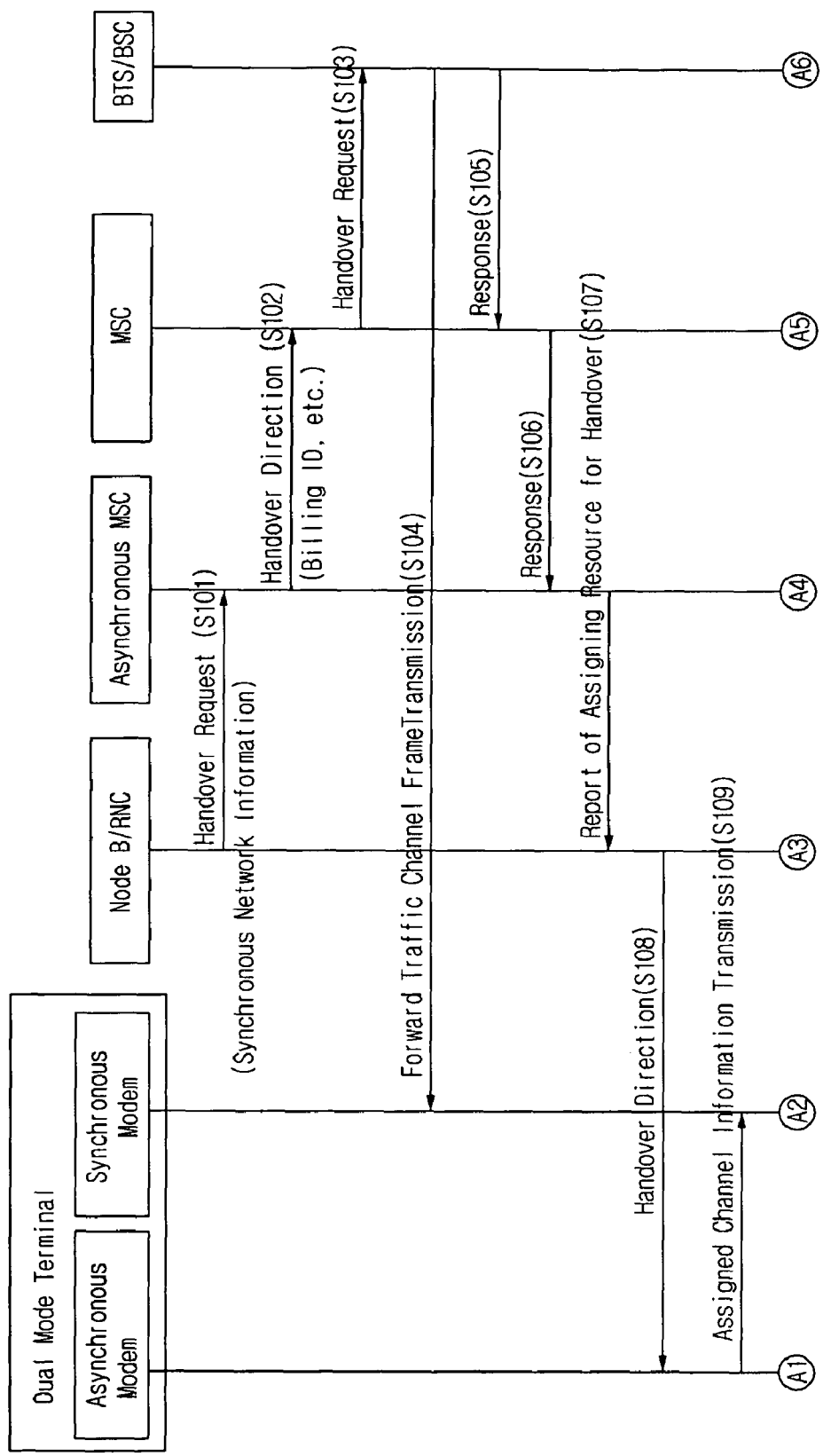
FIGS. 2 and 3 are flow diagrams showing the inter-system handover processes in the mobile communication network shown in FIG. 1 according to one embodiment of the present invention.
Figure 3:
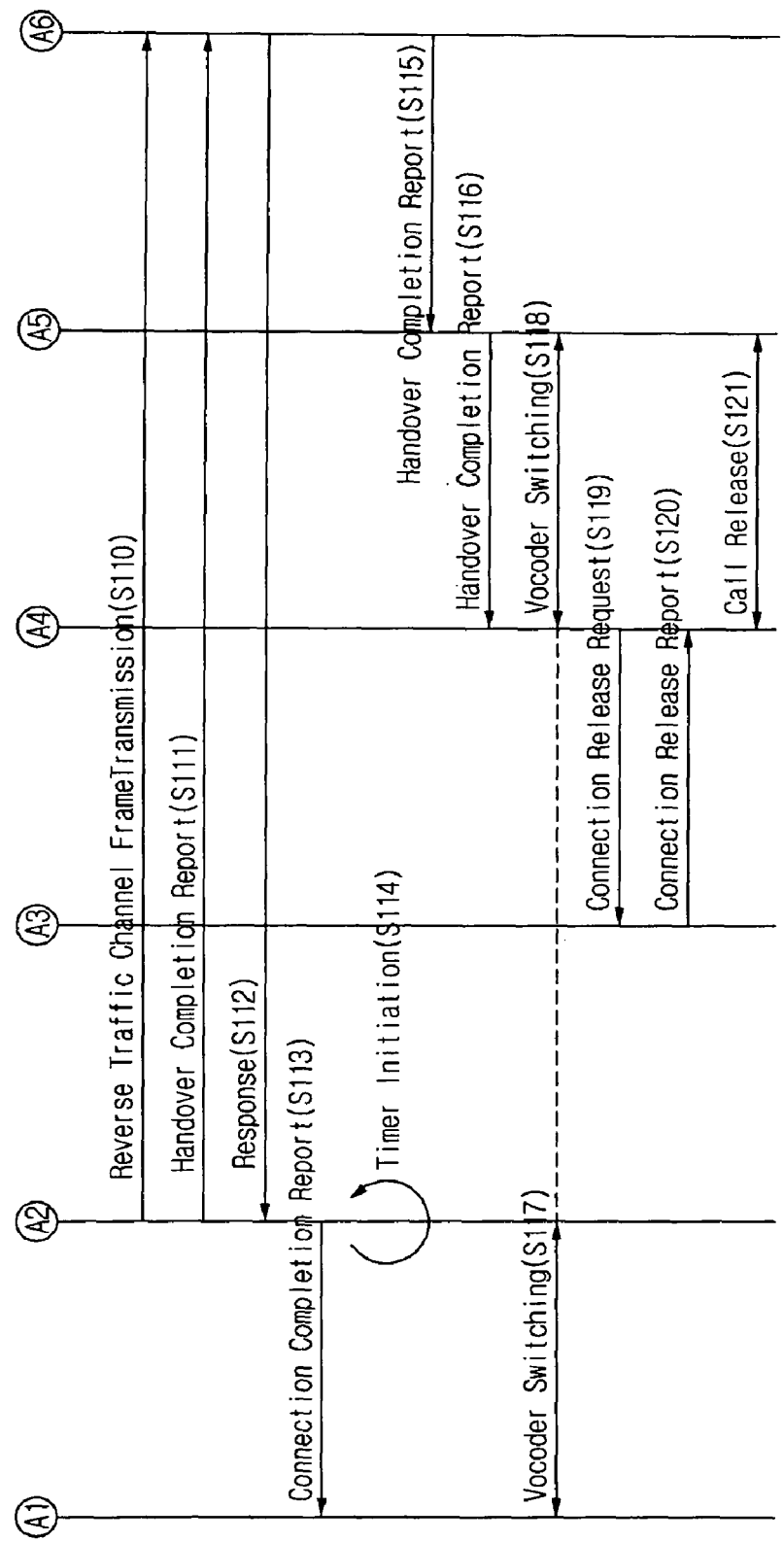

FIGS. 2 and 3 are flow diagrams showing the inter-system handover process in the mobile communication system network shown in FIG. 1 according to one embodiment of the present invention.

Referring to FIG. 1, a mobile terminal (10) applied in the present invention has a dual band or a dual mode mobile terminal, which can be provided to both an asynchronous mobile communication service and a synchronous mobile communication service, and comprises a synchronous modem that is a module for the asynchronous mobile communication service, an asynchronous modem that is a module for the asynchronous mobile communication service, and a common module, and can establish a wireless connection to the asynchronous mobile communication system (20) and a synchronous mobile communication system (30) respectively to use voice and data services. In addition, the mobile terminal (10) includes a timer according to the present invention. When it receives a handover instruction, the mobile terminal (10) actuates the timer, which is set to a predetermined time, as will be explained in more detail, and when the set time of the timer expires, the mobile terminal (10) switches a vocoder thereof.

The asynchronous mobile communication system (20) comprises node B as a base station for a radio section and a radio network controller for controlling the node B (node B/RNC, 210), an asynchronous switching center (MSC, 220) which connects to the radio network controller (210) to perform a call switching for providing services to the mobile terminal (10), SGSN (Serving GPRS Support Node, 230) which is connected between a radio network controller (RNC) and a general packet radio service (GPRS) to keep track of the location of the mobile terminal (10) and control an access and perform a security function, and GGSN (Gateway GPRS Support Node, 250) which is coupled via the SGSN (230) and GPRS (General Packet Radio Service) network (240) and is connected to an IP network (70) to support an interworking/interoperability function unit with an external packet.

In addition, the synchronous mobile communication system (30) comprises a base station which supports a radio section with the mobile terminal (10) and a base station controller (BTS/BSC, 310), a switching center (MSC, 320) for being connected to at least one base station terminal to perform a call switching, a packet data service node (PDSN, 330) for being connected to the base station controller (BSC) to provide a packet data service to a subscriber, and a data core network (DCN, 340) for supporting a connection between IP networks (70).

The asynchronous switching center (220) and the synchronous switching center (320) are also interconnected to No. 7 common signaling network (40) to be thereby connected to a dual stack home location register (D-HLR, 50), and the dual stack home register (50) stores and manages the asynchronous mobile communication system subscription information of the DBDM mobile terminal (10) and the synchronous mobile communication system subscription information corresponding thereto, and allows the asynchronous and synchronous switching centers (220, 230) to refer to the information at the time of performing services such as a handover.

In the network as described above, the mobile terminal (10), which is using a voice call in the asynchronous mobile communication system (20) area, measures a signal strength with the node B, which is currently connected thereto, and a signal strength, which is transmitted to and received from a neighbor base station, and reports the measurement result to the node B, and when the signal strength with the node B is lowered below a predetermined threshold value, the node B reports to the asynchronous switching center (220) through the radio network controller (RNC) that a handover event has occurred. At this time, the node B/RNC (210) transmits the neighbor cell information and the base station ID, which the mobile terminal (10) detected, to the asynchronous switching center (220).

When a handover request message is received from the radio network controller (RNC), the asynchronous switching center (220) determines whether the handover request message is a handover between neighbor cells in the asynchronous mobile communication system (20) or a handover to the synchronous mobile communication system (30), with reference to the neighbor cell information and the base station ID which it received from the radio network controller (RNC).

When the handover request message is a handover between neighbor cells in the asynchronous mobile communication system (20), the asynchronous switching center (220) performs a handover to a neighbor cell, and when the handover request message is a handover to the synchronous mobile communication system (30), the asynchronous switching center (220) performs a handover to the synchronous switching center (320). To this end, the asynchronous switching center (220) switches an asynchronous message to a synchronous message and transmits the synchronous message to the synchronous switching center (320), and the asynchronous switching center (220) must previously construct the synchronous mobile communication system information to database and manage the database.

Hereinbelow, the inter-system handover processes in the system shown in FIG. 1 will be specifically described with reference to FIGS. 2 and 3.

Referring to FIGS. 2 and 3, as the mobile terminal (10), which is using a voice call in the asynchronous mobile communication system (20) area, moves to the synchronous mobile communication system (30) area, the mobile terminal (10) senses signals from the synchronous mobile communication system (30), and periodically measures the signal strength from the node B of the asynchronous mobile communication system (20) and the signal strength with a neighbor cell (or the node B) and reports the measurement result to the node B. Accordingly, when the node B, which is currently connected to the mobile terminal (10), identifies that the signal strength between the mobile terminal (10) and the node B is less than a predetermined value, the node B requests a handover (IU Reloc Required) to the asynchronous switching center (220) through the radio network controller (RNC) (S101).

The handover request message (IU Reloc Required) includes a handover-related message which is used in the synchronous mobile communication system. In addition, the RNC transmits the neighbor base station information, the neighbor cell information, etc. which were received from the mobile terminal (10), and the asynchronous switching center (220) determines whether the handover request message is a handover between neighbor cells in the asynchronous mobile communication system or a handover to the synchronous mobile communication system (30) according to the information.

The asynchronous switching center (220), which received the handover request message, instructs a handover to the synchronous switching center (Facilities Directives2) (S102), and the synchronous switching center (320) requests a handover to the base station controller/base station (310) (Handoff Request) (S103).

Here, the asynchronous switching center (220) generates a billing ID before transmitting a handover instruction message (Facilities Directive2) to the synchronous switching center (320) to include the billing ID into the handover instruction message (Facilities Directive2), and transmits the handover instruction message including the internal switching center circuit ID for each handover interval. Here, the billing ID includes the ID information of the synchronous switching center (320) to be connected to the asynchronous switching center (220)

The base station/base station controller (310), which received the handover request from the synchronous switching center (320), transmits NULL frames to the synchronous modem of the mobile terminal (10) via a forward traffic channel (Null Forward Traffic Channel) frames so that a forward channel is assigned (S104), and then the base station/base station controller (310) transmits a response message (Handoff Request Ack) with respect to the handover request to the synchronous switching center (320). In addition, the synchronous switching center (320) transmits a response message (Facilities Directive2 Ack) with respect to the handover instruction to the asynchronous switching center (220). Accordingly, a trunk is set between the asynchronous switching center (220) and the synchronous switching center (220).

More specifically, the asynchronous switching center (220) sets a mapping between a dedicated channel that is a logical trunk setting identifier and a physical trunk, and sets the information to the internal switching center circuit ID (InterMSCCircuitID) of the handover request message (Facilities Directive2) to be transmitted to the synchronous switching center (320), and when the response message (Facilities Directive2 Ack) is transmitted from the synchronous switching center (320), the trunk is set between the asynchronous switching center (220) and the synchronous switching center (320). The handover request message (Facilities Directive2), which is received and transmitted between the asynchronous switching center (220) and the synchronous switching center (320), includes a parameter including a billing ID, ESN, an internal switching center circuit ID, MIN, etc., and the response message (Facilities Directive2 Ack) includes a parameter such as CDMA channel data, CDMA channel lists, etc.

As such, as the trunk is set between the asynchronous switching center (220) and the synchronous switching center (320), the asynchronous switching center (220) reports to the node B/RNC (210) that the resource assignment for the handover has been completed (IU Relocation Command) (S107), and the node B/RNC (210), which received the report, requests the mobile terminal (10) to perform a handover to the asynchronous modem (Handover from UTRAN Command) (S108).

Then, the asynchronous modem of the mobile terminal (10) transmits channel assignment information to the synchronous modem (Channel Assignment) (S109), and after the synchronous modem of the mobile terminal (10) transmits a frame or a preamble to the base station/base station controller (310) of the synchronous mobile communication system through a reverse traffic channel (Reverse Traffic Channel Frames of Traffic Channel Preamble) (S110), the synchronous modem reports that the handover has been completed (Handoff Completion Message) (S111). The base station/base station controller (310), which received the report, transmits a response signal thereto (BS Ack Order) (S112). Then, the synchronous modem reports to the asynchronous modem that the connection with the synchronous mobile communication system has been completed (Call Connection) (S113).

Now, the synchronous modem of the mobile terminal (10) switches a vocoder after the step (S113) in which the connection with the synchronous mobile communication system has been completed. In doing so, since a silent period occurs until the mobile communication system reaches the timing of switching the vocoder, according to the present invention, the mobile terminal (10) actuates the timer, which is set to a pre-determined time, so that the vocoder of the mobile terminal (10) can be switched at the timing of switching the vocoder of the mobile communication system.

Meanwhile, the base station/base station controller (310) reports to the synchronous switching center (320) that the handover has been completed (Handoff Complete) (S115), and the synchronous switching center (320) reports to the asynchronous switching center (220) that the handover has been completed (Mobile On Channel) (S116).

The timing of switching the vocoder of the mobile communication system is implemented after the step (S116) of the synchronous switching center (320) reporting to the synchronous switching center (220) that the handover has been completed. According to the present invention, after the synchronous modem of the mobile terminal (10) reports to the asynchronous modem that the handover has been completed, the asynchronous switching center (220) actuates the timer during the time of reporting that the handover has been completed in the synchronous switching center (320), and when the timer operation is completed, the vocoder of the mobile terminal (10) is switched (S117) and at the same time the vocoder of the mobile communication system is also switched (S118).

By doing so, the mobile terminal (10) and the vocoder of the mobile communication system are switched simultaneously, so that the occurrence of the silent period is minimized.

Subsequently, the asynchronous switching center (220) requests the node B/RNC to release the connection, and as the asynchronous switching center (220) receives a response thereto, the connection between the asynchronous switching center (220) and the node B/RNC (IU Release Command, IU Release Complete) (S119, S120) is released.

Then, after the handover from the mobile terminal (10), which is during a voice call in the asynchronous mobile communication system, to the synchronous mobile communication system (320) has been completed, the call is released upon request of either of the two mobile terminals during a call. The mobile terminal of a subscriber in the asynchronous mobile communication system area may first request the call release, or the mobile terminal of a subscriber who handed over to the synchronous mobile communication system area may first request the call release.

If the mobile terminal in the asynchronous mobile communication system area releases the call, the asynchronous switching center (220) transmits a call release request message (Facilities Release) to the synchronous switching center (320), and the synchronous switching center (320), which received the message, responds to the message (Facilities Ack), so that the trunk, which is set between the switching centers, is released.

Second Embodiment

Figure 4:
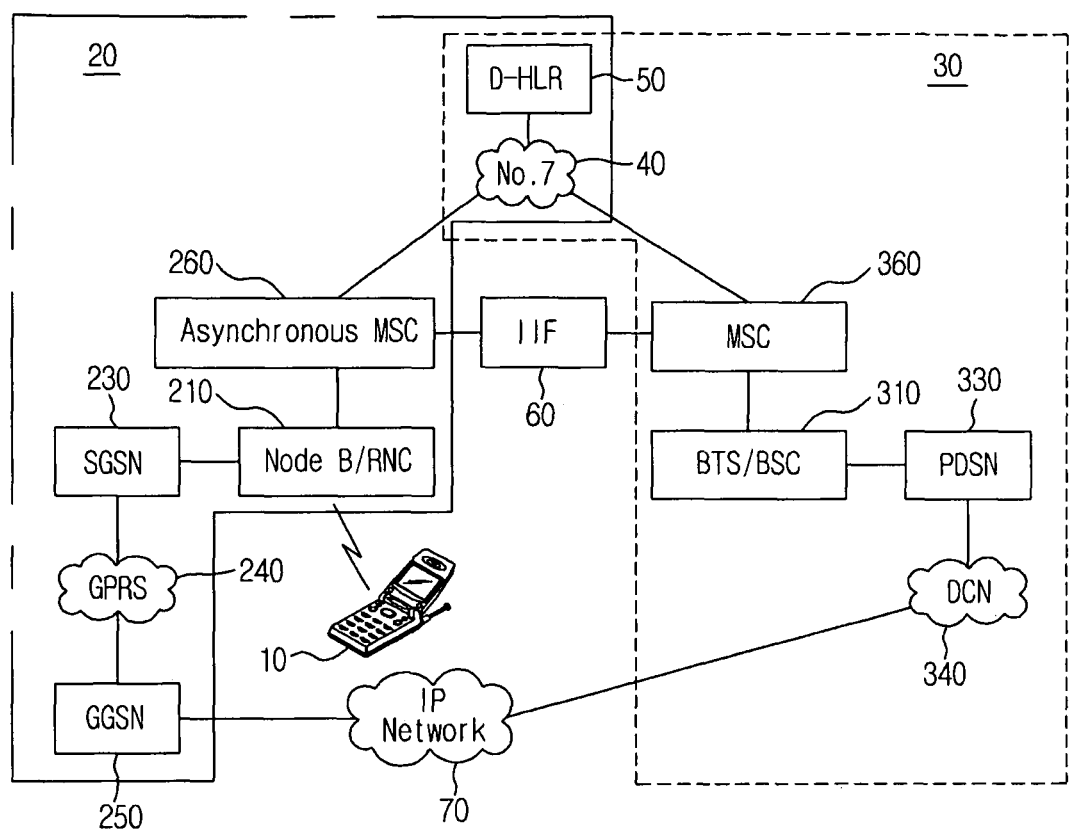
FIG. 4 shows another embodiment of a mobile communication network to which the present invention is applied and in which an asynchronous mobile communication system and a synchronous mobile communication are mixed.

FIG. 4 shows another embodiment of a mobile communication system to which the present invention is applied and in which an asynchronous mobile communication system and a synchronous mobile communication system co-exist.

Figure 5:
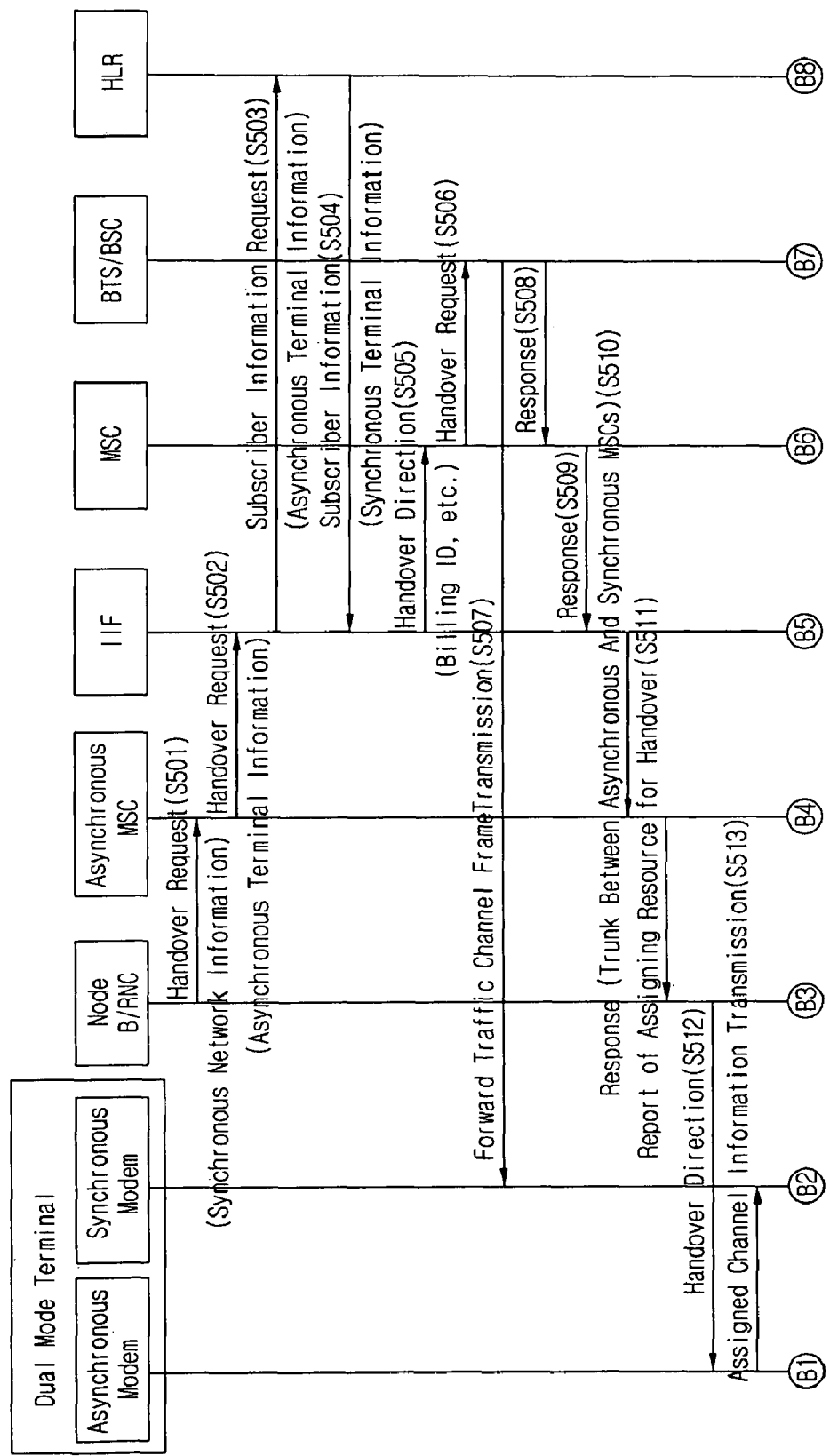
FIGS. 5 and 6 are flow diagrams showing the inter-system handover processes in the mobile communication network shown in FIG. 4 according to another embodiment of the present invention.
Figure 6:
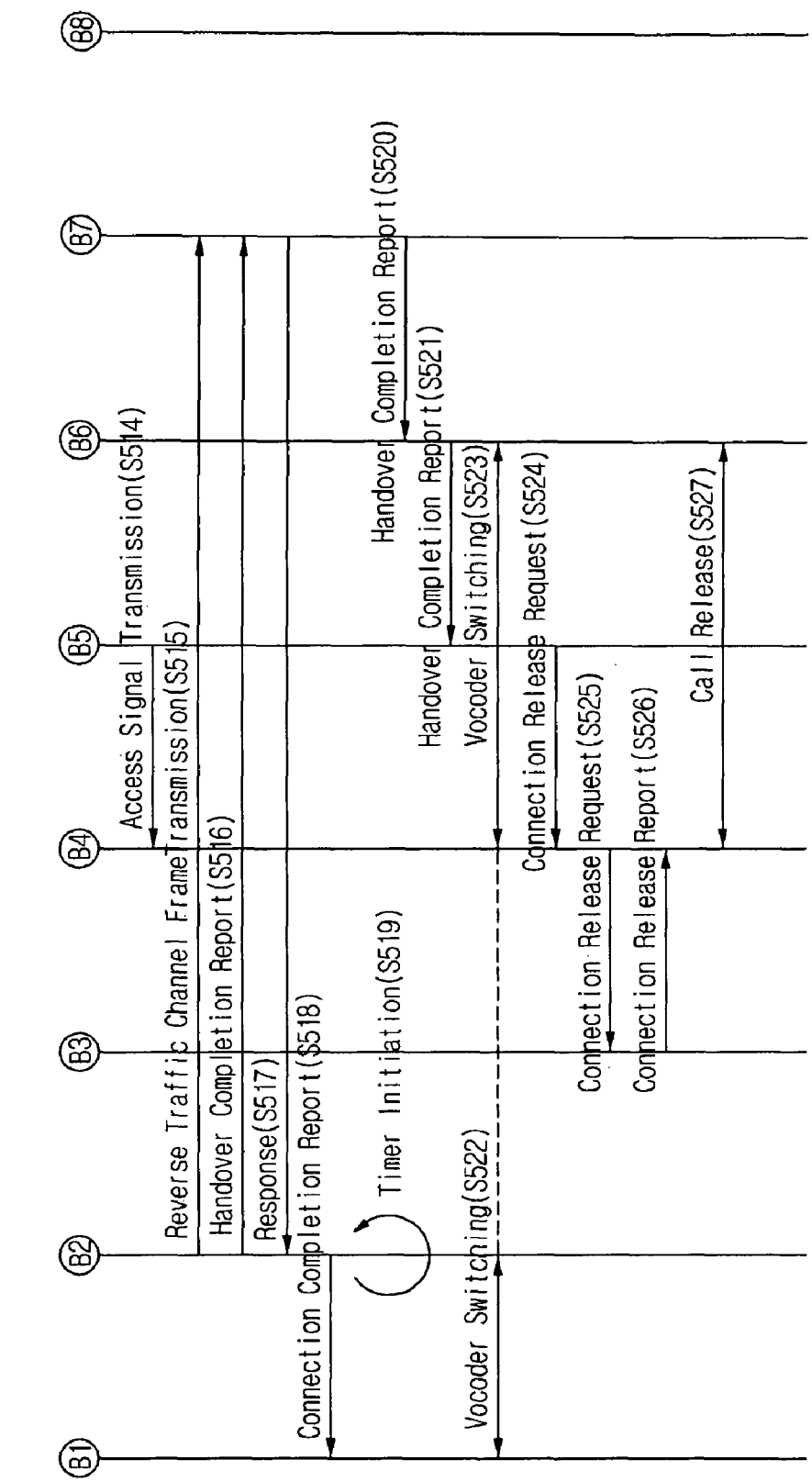

FIGS. 5 and 6 are flow charts showing the inter-system handover processes in the mobile communication system shown in FIG. 4 according to another embodiment of the present invention.

In FIG. 4, since reference numbers indicate the identical elements as FIG. 1, they need not be described in greater detail herein.

Referring to FIG. 4, the switching centers (260, 360) of the asynchronous mobile communication system (20) and the synchronous mobile communication system (30), unlike FIG. 1, are interconnected to each other by the interworking/interoperability function unit, and the interworking/interoperability function unit (60) transforms an asynchronous message transmitted from the asynchronous switching center (260) into a synchronous message, transmits the synchronous message to the synchronous switching center (360), and constructs and manages the synchronous mobile communication information to database. (Interworking Interoperability Function; IIF, 60)

In such network configuration, the mobile terminal (10), which is using a voice call in the asynchronous mobile communication system (20) area, periodically measures a signal strength with the node B and a signal strength with a neighbor base station, and reports the measurement result to the node B. When the signal strength is lowered to less than a predetermined threshold, the node B reports to the asynchronous switching center (260) through the RNC that the handover event has occurred. At this time, the node B/RNC (210) transmits the neighbor cell information, the base station ID, etc., which the mobile terminal (10) detected, to the asynchronous switching center (260).

When the handover request message is received from the RNC, the asynchronous switch center (260) determines whether the handover request message is a handover between neighbor cells in the asynchronous mobile communication system or a handover to the synchronous mobile communication system (30), with reference to the neighbor cell information, the base station ID, etc., which were received from the RNC.

When the handover request message is a handover between neighbor cells in the asynchronous mobile communication system (20), the asynchronous switching center (260) performs a handover to a neighbor cell, and when the handover request message is a handover to the synchronous mobile communication system (30), the asynchronous switching center (260) performs a handover to the synchronous switching center (360) through IIF (60). To this end, the IIF (60) switches an asynchronous message to a synchronous message and transmits the synchronous message to the synchronous switching center (360), and the asynchronous switching center (220) must previously construct the synchronous mobile communication system information to database and manage the database. The database includes switching center information, signal points, trunk information relating to dedicated channels, and so on. The IIF (60) selects a handover objective switching center (320) according to the handover request from the asynchronous switching center (260) and the synchronous mobile communication system information, and generates a billing ID including a handover objective switching center ID and so on to use it at the subsequent handover procedures.

The handover processes shown in FIG. 4 will be explain in more detail with reference to FIGS. 5 and 6 below.

Referring to FIGS. 5 and 6, as the mobile terminal (10), which is using a voice call in the asynchronous mobile communication system (20) area, moves to the synchronous mobile communication system (30) area, the mobile terminal (10) senses signals from the synchronous mobile communication system (30), and periodically measures the signal strength from the node B of the asynchronous mobile communication system (20) and the signal strength with a neighbor cell (or the node B) and reports the measurement result to the node B. Accordingly, when the node B, which is currently connected to the mobile terminal (10), identifies that the signal strength between the mobile terminal (10) and the node B is less than a predetermined value, the node B requests a handover (IU Reloc Required) to the asynchronous switching center (260) via the radio network controller (IU Rloc Required) (S501).

The handover request message (IU Reloc Required) includes a handover-related message which is used in the synchronous mobile communication system. In addition, the RNC transmits the neighbor base station information (base station ID), the neighbor cell information, etc. which were received from the mobile terminal (10), and the asynchronous switching center (260) determines whether the handover request message is a handover between neighbor cells in the asynchronous mobile communication system or a handover to the synchronous mobile communication system (30) according to the information. The handover request message (IU Reloc Required), which the RNC transmits to the asynchronous switching center (260), includes a message type, a handover type, a source base station controller ID, a target base station controller ID, RAD (radio Access Bearer) information, and radio section-related information.

The asynchronous switching center (260), which received the handover request message, transmits an asynchronous message requesting a handover to the interworking/interoperability function unit (60) (MAP Prep Handover Req) (S502). At this time, the asynchronous switching center (260) adds an extension container to the asynchronous message and then transmits an asynchronous identification signal (MSISDN) of the mobile terminal (10), and the message includes the parameter such as an invoke ID, a target cell ID, a target radio network controller ID, MSISDN, etc.

Then, the interworking/interoperability function unit (60) requests the dual stack home location register (50) to transmit the subscriber information with reference to the asynchronous subscriber information (MSISDN) which was received from the asynchronous switching center (260) (Call Data Request) (S103). That is, the interworking/interoperability function unit (60) requests synchronous network identifiers (MIN, ESN) of the mobile terminal (10). At step S503, the interworking/interoperability function unit (60) may request the synchronous identifier information of the subscriber to the dual stack home location register (50) by using the asynchronous message (MAP_SEND_IMSI).

The dual stack home location register (50), which received the subscriber information request of the interworking/interoperability function unit (60), extracts the synchronous identifier information (MIN, ESN) of the subscriber by querying the database to transmit to the interworking/interoperability function unit (60) (Call Data Req Ack) (S104). The interworking/interoperability function unit (60), which received the synchronous identifier information, instructs an handover to the synchronous switching center (360) (Facilities Directive2) (S505), and the synchronous switching center (360) requests a handover to the base station controller/base station (310) (Handoff Request) (S506). Here, the synchronous network message (Call Data Request) requesting the synchronous identifier information of the subscriber includes a parameter such as a billing ID, digits (i.e., MSISDN), etc., and the response message (Call Data Req Ack) includes a parameter such as ESN, MIN, MSCID, etc.

Meanwhile, when the asynchronous message (MAP_SEND-IMSI) is used to request the synchronous network identifier information of the subscriber, the parameter included in the asynchronous message include an invoke ID, MSISDN, IMSI, ESN, etc.

Here, the interworking/interoperability function unit (60) generates a billing ID before transmitting a handover instruction message (Facilities Directive2) to the synchronous switching center (360) to include the billing ID into the handover instruction message (Facilities Directive2), and transmits the handover instruction message including the internal switching center circuit ID for each handover interval. Here, the billing ID includes the ID information of the synchronous switching center (360) to be connected to the asynchronous switching center (260).

The base station/base station controller (310), which received the handover request from the synchronous switching center (320), transmits NULL frames to the synchronous modem of the mobile terminal (10) through a forward traffic channel (Null Forward Traffic Channel frames) so that a forward channel is assigned (S507), and then the base station/base station controller (310) transmits a response message (Handoff Request Ack) with respect to the handover request to the synchronous switching center (320) (S508). In addition, the synchronous switching center (320) transmits a response message (Facilities Directive2 Ack) with respect to the handover instruction to the interworking/interoperability function unit (60) (S509), and the interworking/interoperability function unit (60) transmits a response message (MAP Prep Handover Resp) with respect to the handover request at step S502 to the asynchronous switching center (S510). Accordingly, a trunk is set between the asynchronous switching center (260) and the synchronous switching center (360).

More specifically, the interworking/interoperability function unit (60) sets a mapping between a dedicated channel that is a logical trunk setting identifier and a physical trunk, and sets the information to the internal switching center circuit ID (InterMSCCircuitID) of the handover request message (Facilities Directive2) to be transmitted to the synchronous switching center (360), and when the response message (Facilities Directive2 Ack) is transmitted from the synchronous switching center (360), the trunk is set between the asynchronous switching center (260) and the synchronous switching center (320). The handover request message (Facilities Directive2), which is transmitted between the interworking/interoperability function unit (60) and the synchronous switching center (360), includes a parameter such as a billing ID, ESN, an internal switching center circuit ID, MIN, etc., and the response message (Facilities Directive2 Ack) includes a parameter such as CDMA channel data, CDMA channel lists, etc.

As such, as the trunk is set between the asynchronous switching center (260) and the synchronous switching center (360), the asynchronous switching center (220) reports to the node B/RNC (210) that the resource assignment for the handover has been completed (IU Relocation Command) (S511), and the node B/RNC (210), which received the report, requests the mobile terminal (10) to perform a handover to the asynchronous modem (Handover from UTRAN Command) (S512). Here, the message (IU Relocation Command) reporting that the resource assignment has been completed includes a parameter such as a message type, an RRC container, an RAB list to be released, etc.

Thereafter, the asynchronous modem of the mobile terminal (10) transmits channel assignment information to the synchronous modem (Channel Assignment) (S513), and the interworking/interoperability function unit (60) requests an access signal (MAP Process Access Signaling Req) to the asynchronous switching center (260) (S514), the access signal including an invoke ID, an application protocol data unit (APDU), selected wireless resource information, etc.

Then, the asynchronous modem of the mobile terminal (10) transmits channel assignment information to the synchronous modem (Channel Assignment) (S515), and after the synchronous modem of the mobile terminal (10) transmits a frame or a preamble to the base station/base station controller (310) of the synchronous mobile communication system through a reverse traffic channel (Reverse Traffic Channel Frames of Traffic Channel Preamble) (S110), the synchronous modem reports that the handover has been completed (Handoff Completion Message) (S111). The base station/base station controller (310), which received the report, transmits a response signal thereto (BS Ack Order) (S112). Accordingly, the connection between the synchronous modem of the mobile terminal and the synchronous mobile communication system has been completed, and the synchronous modem of the mobile terminal reports to the asynchronous modem that the connection with the synchronous mobile communication system has been completed (Call Connection) (S518).

Now, the synchronous modem of the mobile terminal (10) switches a vocoder after step S518 in which the connection with the synchronous mobile communication system has been completed. In doing so, since a silent period occurs until the mobile communication system reaches the timing of switching the vocoder, according to the present invention, the mobile terminal (10) actuates the timer, which is set to a pre-determined time, so that the vocoder of the mobile terminal (10) can be switched at the time of switching the vocoder of the mobile communication system (S519).

Meanwhile, the base station/base station controller (310) reports to the synchronous switching center (320) that the handover has been completed (Handoff Complete) (S115), and the synchronous switching center (320) reports to the asynchronous switching center (220) that the handover has been completed (Mobile On Channel) (S116).

The timing of switching the vocoder of the mobile communication system is implemented after step S521 in which the synchronous switching center (320) reports to the synchronous switching center (260) that the handover has been completed. According to the present invention, after the synchronous modem of the mobile terminal (10) reports to the asynchronous modem that the handover has been completed, the asynchronous switching center (220) actuates the timer during the time of reporting that the handover has been completed in the synchronous switching center (320), and when the timer operation is completed, the vocoder of the mobile terminal (10) is switched (S522) and at the same time the vocoder of the mobile communication system is also switched (S523).

By doing so, the mobile terminal (10) and the vocoder of the mobile communication system are switched simultaneously, so that the occurrence of the silent period is minimized.

Thereafter, the interworking/interoperability function unit (60) requests the asynchronous switching center (260) to release the connection (MAP Send End Signal Req) (S524), so that the connection between the asynchronous switching center (260) and the node B/RNC is released (IU Release Command, IU Release Complete) (525, S526).

Then, after the handover from the mobile terminal (10), which is during a voice call in the asynchronous mobile communication system, to the synchronous mobile communication system has been completed according to the above-described steps, the call is released upon request of either of the two mobile terminals which are during a call. The call release may be requested firstly from the mobile terminal of a subscriber in the asynchronous mobile communication system area, or it may be requested first from the mobile terminal of a subscriber who handed over to the synchronous mobile communication system area.

If the mobile terminal in the asynchronous mobile communication system area releases the call, the asynchronous switching center (260) transmits a call release request message (Facilities Release) to the interworking/interoperability function unit (60), and the interworking/interoperability function unit (60), which received the message, responds to the message (Facilities Ack), so that the trunk, which is set between the switching centers, is released. Here, the call release request message (Facilities Release) includes a parameter such as an internal MSC circuit ID, a release cause, a billing ID, MIN, etc., and the response message (Facilities Ack) includes a parameter such as a billing ID, etc.

Third Embodiment

Figure 7:
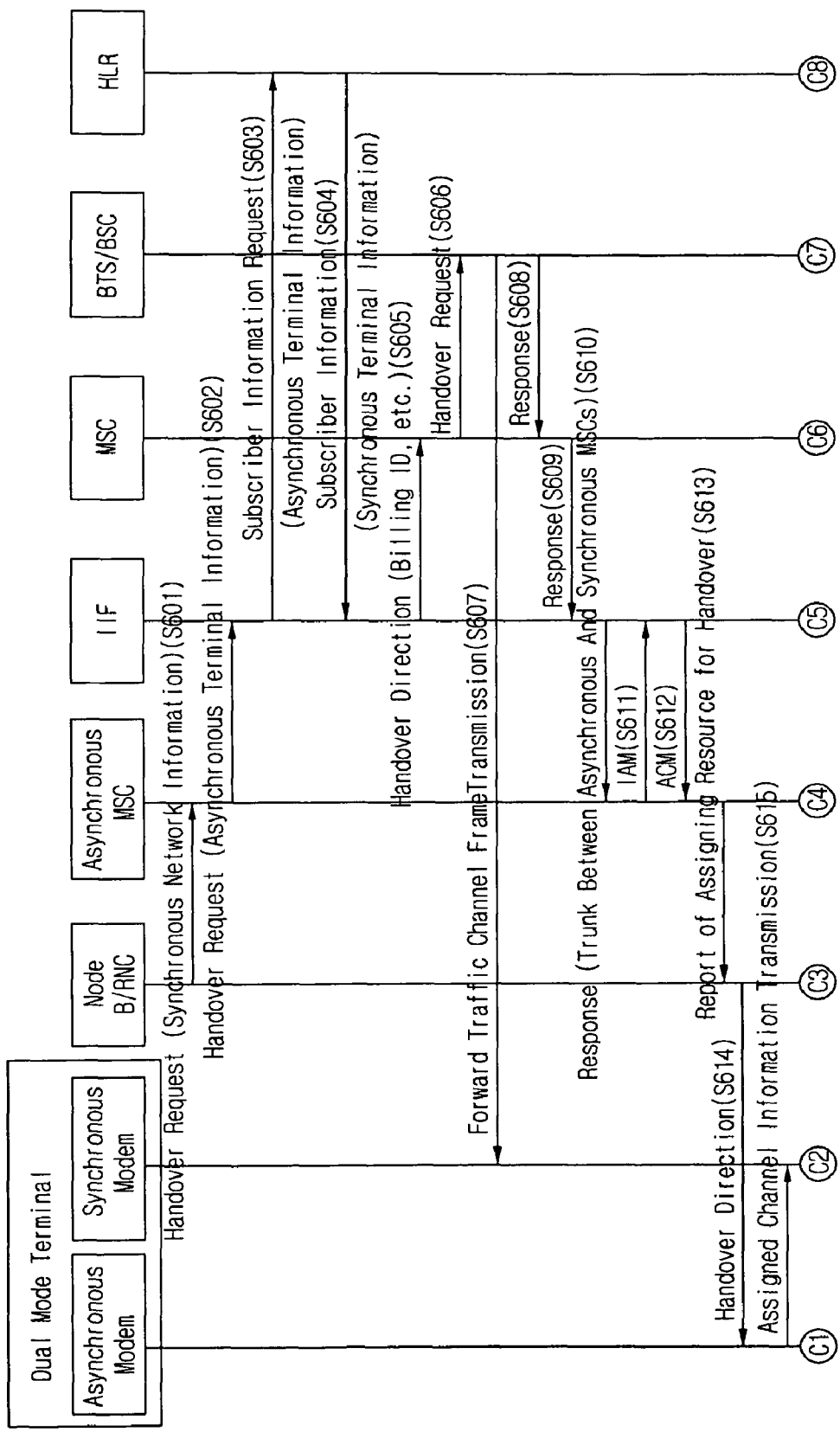
FIGS. 7 and 8 are flow diagrams showing the inter-system handover processes in the mobile communication network shown in FIG. 4 according to another embodiment of the present invention.
Figure 8:
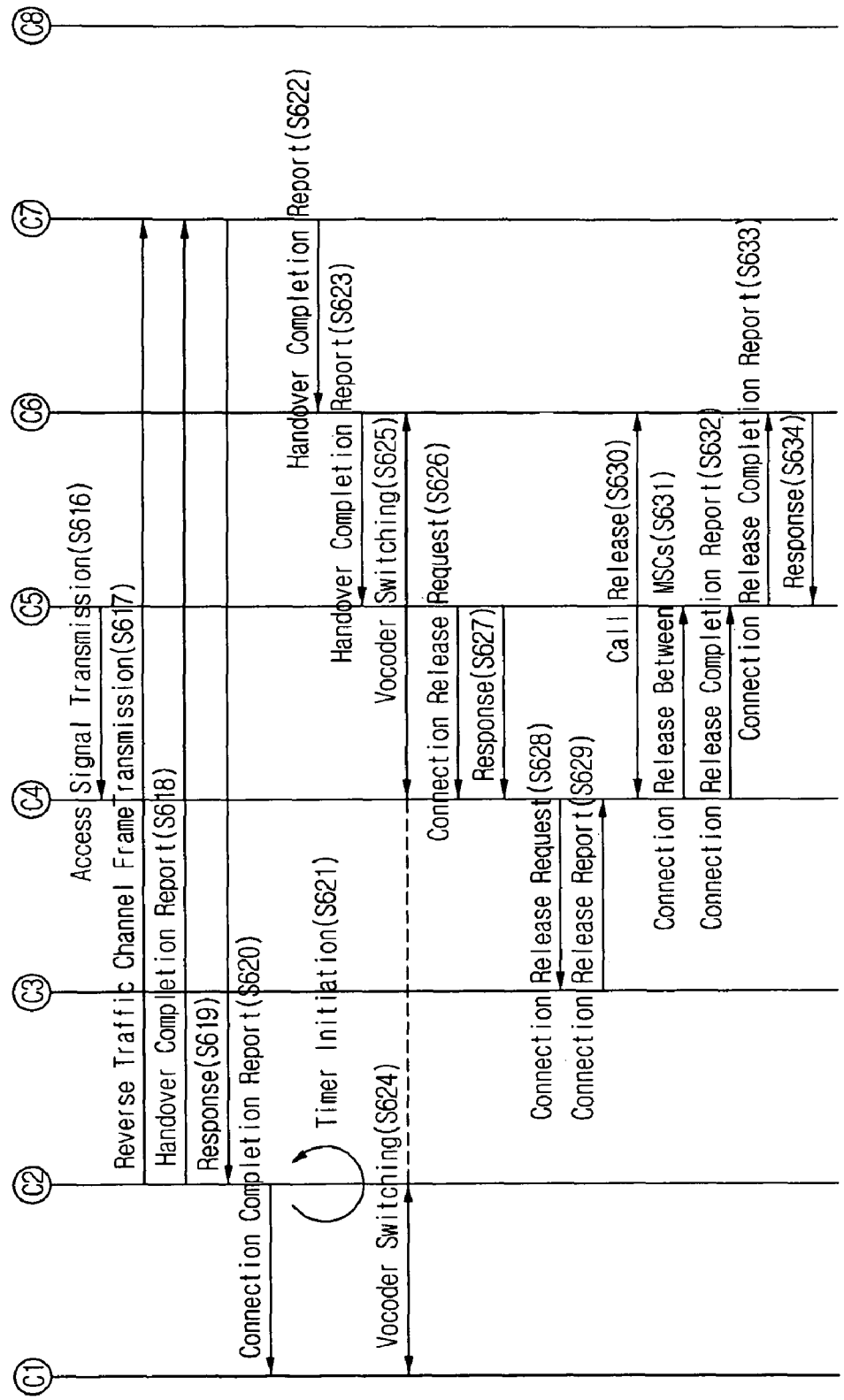

FIGS. 7 and 8 are flow charts showing the inter-system handover procedures in the mobile communication network shown in FIG. 3 according to another embodiment of the present invention, wherein the asynchronous switching center and the synchronous switching center are interconnected by the interworking/interoperability function unit, and the ISUP, which is a message transfer protocol between the switching centers, is used.

As the mobile terminal (20), which is using a voice call in the asynchronous mobile communication system (30) area, moves to the synchronous mobile communication system (30) area, the mobile terminal (10) senses signals from the synchronous mobile communication system (30), and periodically measures a signal strength from the node B of the asynchronous mobile communication system (20) and the signal strength with a neighbor cell (or the node B) and reports the measurement result to the node B. Thereafter, when the node B, which is currently connected to the mobile terminal (10), identifies that a signal strength between the mobile terminal (10) and the node B is less than a predetermined value, the node B requests a handover (IU Reloc Required) to the asynchronous switching center (260) through the radio network controller (RNC) (S601).

The handover request message (IU Reloc Required) includes a handover-related message which is used in the synchronous mobile communication system. In addition, the RNC transmits the neighbor base station information, the neighbor cell information (base station ID), etc., which were received from the mobile terminal (10), and the asynchronous switching center (260) determines whether the handover request message is a handover between neighbor cells in the asynchronous mobile communication system or a handover to the synchronous mobile communication system (30) according to the information. The handover message (IU Reloc Required), which the RNC transmits to the asynchronous switching center (260), includes a parameter such as a message type, a handover type, a handover cause, a source base station controller ID, a target base station controller ID, RAB (Radio Access Bearer) information, and radio section-related information. In addition, the RNC further includes Old BSS To New BSS Information parameter included in the handover request message including the handover-related information used in the synchronous mobile communication system.

The asynchronous switching center (260), which received the handover request message, transmits an asynchronous message requesting for a handover to the interworking/interoperability function unit (60) (MAP Prep Handover Req) (S602). At this time, the asynchronous switching center (260) adds an extension container to the asynchronous message and transmits the asynchronous identification number (MSISDN) of the mobile terminal (10), and the asynchronous message includes a parameter such as an invoke ID, a target cell ID, a target radio controller ID, MSISDN, etc.

Thereafter, the interworking/interoperability function unit (60) requests the dual stack home location register (50) to transmit the subscriber information with reference to the asynchronous subscriber information (MSISDN), which was received from the asynchronous switching center (260) (Call Data Request) (S603). That is, the interworking/interoperability function unit (60) requests for the asynchronous identifiers (MN, ESN) of the mobile terminal (10). At step S103, the interworking/interoperability function unit (60) may request the synchronous network identifier information of the subscriber to the dual stack home location register (50) by using the asynchronous message (MAP_SEND-IMSI).

The dual stack home location register, which received the subscriber information request from the interworking/interoperability function unit (60), queries the database and extracts the synchronous network identifier information (MIN, ESN) of the corresponding subscriber and then transmit it to the interworking/interoperability function unit (60) (Call Data Req Ack) (S604). Here, the synchronous network message (Call Data Request) requesting for the synchronous network information of the subscriber includes a parameter such as a billing ID, digits (i.e., MSISDN), etc., and the response message (Call Data Req Act) includes a parameter such as ESN, MIN, MSCID, etc. Meanwhile, when the asynchronous message (MSP_SEND_IMSI) is used to request the synchronous network identifier information of the subscriber, the parameter included in the message includes an invoke ID, MSISDN, IMSI, ESN, etc.

The interworking/interoperability function unit (60), which received the subscriber information from the dual stack home location register (50), instructs the synchronous switching center (360) to perform a handover (Facilities Directives2) (S105), and the synchronous switching center (360) requests a handover to the base station controller/base station (310) (Handoff Request) (S606).

As such, the interworking/interoperability function unit (60) generates a billing ID before transmitting a handover instruction message (Facilities Directive2) to the synchronous switching center (360) to include the billing ID into the handover instruction message (Facilities Directive2), and transmits the handover instruction message including the internal switching center circuit ID for each handover interval. Here, the billing ID includes the ID information of the synchronous switching center (360) to be connected to the asynchronous switching center (260)

The base station/base station controller (310), which received the handover request from the synchronous switching center (320), transmits NULL frames to the synchronous modem of the mobile terminal (10) via a forward traffic channel (Null Forward Traffic Channel frames) so that a forward channel is assigned (S607), and then the base station/base station controller (310) transmits a response message (Handoff Request Ack) with respect to the handover request to the synchronous switching center (320) (S608). In addition, the switching center (320) transmits a response message (Facilities Directive2 Ack) with respect to the handover instruction to the interworking/interoperability function unit (60), and the interworking/interoperability function unit (60) transmits a response message (MAP Prep Handover Resp) with respect to the handover request at step S602 to the asynchronous switching center (260) (S610). Accordingly, a trunk is set between the asynchronous switching center (260) and the synchronous switching center (360).

More specifically, the interworking/interoperability function unit (60) sets a mapping between a dedicated channel that is a logical trunk setting identifier and a physical trunk, and sets the information to the internal switching center circuit ID (InterMSCCircuitID) of the handover request message (Facilities Directive2) to be transmitted to the synchronous switching center (360), and when the response message (Facilities Directive2 Ack) is transmitted from the synchronous switching center (360), the trunk is set between the asynchronous switching center (260) and the synchronous switching center (360). The handover request message (Facilities Directive2), which is transmitted between the asynchronous switching center (220) and the synchronous switching center (320), includes a parameter including a billing ID, ESN, an internal switching center circuit ID, MIN, etc., and the response message (Facilities Directive2 Ack) includes a parameter such as CDMA channel data, CDMA channel lists, etc.

Then, the asynchronous switching center (260) transmits IAM (Initial Address Message) to the interworking/interoperability function unit (60), and interworking/interoperability function unit (60) transmits an ACM (Address complete message) with respect to the IAM, so that a trunk is set between the asynchronous switching center (260) and the synchronous switching center (360), whereby a call is routed (S611). The message for setting the trunk between the switching centers is transmitted by ISUP.

As such, as the trunk is set between the asynchronous switching center (220) and the synchronous switching center (320), the asynchronous switching center (220) reports to the node B/RNC (210) that the resource assignment for the handover has been completed (IU Relocation Command) (S107), and the node B/RNC (210), which received the report, requests the mobile terminal (10) to perform a handover to the asynchronous modem (Handover from UTRAN Command) (S108). Here, the message (IU Relocation Command) reporting that the resource assignment has been completed includes a parameter such as a message type, an RRC container, an RAB list to be released, etc.

Thereafter, the asynchronous modem of the mobile terminal transmits the channel assignment information to the synchronous modem (Channel Assignment) (S115), and the interworking/interoperability function unit (60) requests an access signal to the asynchronous switching center (260) (MAP Process Access Signaling Req) (S116). The access signal includes an invoke ID, an application protocol data unit (APDU), selected wireless resource information, etc.

In addition, the synchronous modem of the mobile terminal (10) transmits a frame or a preamble to the base station/base station controller (310) of the synchronous mobile communication system via a reverse traffic channel (Reverse Traffic Channel Frames of Traffic Channel Preamble) (S617), and reports that the handover has been completed (Handoff complete message) (S618). The base station/base station controller (310), which received the report, transmits a response signal thereto (BS Ack Order) (S619). Then, the synchronous modem reports to the asynchronous modem that the connection with the synchronous mobile communication system has been completed (Call Connection) (S620).

Now, the synchronous modem of the mobile terminal (10) switches a vocoder after the step (S620) in which the connection with the synchronous mobile communication system has been completed. In doing so, since a silent period occurs until the mobile communication system reaches the time of switching the vocoder, according to the present invention, the mobile terminal (10) actuates the timer which is set to a pre-determined time, so that the vocoder of the mobile terminal (10) can be switched at the timing of switching the vocoder of the mobile communication system (S621).

Meanwhile, the base station/base station controller (310) reports to the synchronous switching center (320) that the handover has been completed (Handoff Complete) (S115), and the synchronous switching center (320) reports to the asynchronous switching center (220) that the handover has been completed (Mobile On Channel) (S116).

The timing of switching the vocoder of the mobile communication system is implemented after step S116 in which the synchronous switching center (220) is reported by the synchronous switching center (320) that the handover has been completed. According to the present invention, after the synchronous modem of the mobile terminal (10) reports to the asynchronous modem that the handover has been completed, the asynchronous switching center (220) actuates the timer during the time of reporting that the handover has been completed in the synchronous switching center (320), and when the timer operation is completed, the vocoder of the mobile terminal (10) is switched (S117) and at the same time the vocoder of the mobile communication system is also switched (S118).

By doing so, the mobile terminal (10) and the vocoder of the mobile communication system are switched simultaneously, so that the occurrence of the silent period is minimized.

Then, the interworking/interoperability function unit (60) requests the asynchronous switching center (260) to release the connection (MAP Send End Signal Req) (S626), transmits to the asynchronous switching center (260) a message reporting that the synchronous switching center (360) has been connected with the mobile terminal (ANSWER) (S627), and the connection between the asynchronous switching center (260) and Node B/RNC is released (IU Release Command, IU Release Complete) (S628, S629).

Then, after the handover from the mobile terminal (10), which is during a voice call in the asynchronous mobile communication system, to the synchronous mobile communication system (320) has been completed, the call is released upon request of either of the two mobile terminals during a call. The call release may be requested firstly from the mobile terminal of a subscriber in the asynchronous mobile communication system area, or it may be requested first from the mobile terminal of a subscriber which handed over to the synchronous mobile communication system area. The present embodiment will explain the case where the mobile terminal of a subscriber in the asynchronous mobile communication system area requests a call release.

As the call of the mobile terminal is released, the call between the asynchronous switching center (260) and the synchronous switching center (360) is released (Call Release) (S630), and the connection between the switching centers is released (Release) (S631). Thereafter, the asynchronous switching center (260) reports to the interworking/interoperability function unit (60) that the connection release has been completed (MAP Send End Signal Resp) (S632), the interworking/interoperability function unit (60) transmits a call release request message (Facilities Release) to the synchronous switching center (360), and the synchronous switching center (360) responds to the call release request message (Facilities Ack), so that the trunk, which is set between the switching centers, is released (S634). Here, the call release request message (Facilities Release) includes a parameter such as an internal MSC circuit ID, release causes, a billing ID, MIN, etc., and the response message (Facilities Ack) includes a parameter such as a billing ID, etc.

According to the present invention, the asynchronous switching center determines whether the call release message is a handover in the asynchronous mobile communication system or a handover to the synchronous mobile communication system. In addition, when it is identified as a handover to the synchronous mobile communication system, the asynchronous switching center performs the handover by using the interworking/interoperability function unit (IIF) as a converter while transmitting to and receiving from the switching center of the synchronous mobile communication system. To do this, the interworking/interoperability function unit must previously construct the synchronous mobile communication system information to database and store the database.

Furthermore, in order to resolve the problem that a silent period occurs until the mobile communication system switches the vocoder after the mobile terminal switches the vocoder, the present invention switches the vocoders of the mobile communication system and the mobile terminal simultaneously to minimize the silent period at the time of a handover during a voice call.

While this invention has been particularly shown and described with references to preferred embodiments thereof, it will be understood by those skilled in the art that various changes in form and details may be made therein without departing from the scope of the invention encompassed by the appended claims.

The invention claimed is:

1. In a mobile communication system in which an asynchronous mobile communication system and a synchronous mobile communication system co-exist and in which said asynchronous mobile communication system and said synchronous mobile communication system are connected by an interworking/interoperability function unit, a method of handover for minimizing a silent period during a voice call of a dual band dual mode mobile terminal, which is communicable with both said asynchronous mobile communication system and said synchronous mobile communication system, said method comprising the steps of:

an asynchronous switching center of the asynchronous mobile communication system transmitting a handover request message to said interworking/interoperability function unit, and said interworking/interoperability function unit requesting a dual stack home location register to transmit subscriber information of said mobile terminal and receiving said subscriber information;

said interworking/interoperability function unit instructing a handover to a synchronous switching center of said synchronous mobile communication system, and said synchronous switching center requesting a handover to a base station controller/base station of said synchronous mobile communication system;

said base station/base station controller assigning a forward traffic channel to said mobile terminal, and transmitting a response message with respect to the handover request to said synchronous switching center;

said synchronous switching center communicating with said asynchronous switching center via said interworking/interoperability function unit, so that a trunk is set between said asynchronous switching center and said synchronous switching center;

said asynchronous switching center reporting to a radio network controller of said asynchronous mobile communication system that a resource assignment for the handover has been completed;

said radio network controller instructing said mobile terminal to switch to a synchronous connection mode for communication with the synchronous mobile communication system;

said interworking/interoperability function unit transmitting an access signal to said asynchronous switching center;

said mobile terminal transmitting a frame and a preamble to said base station/base station controller through a reverse traffic channel, and reporting that the handover has been completed;

said mobile terminal actuating a timer as the connection to said synchronous mobile communication system has been completed;

said base station/base station controller reporting to said synchronous switching center that the handover has been completed, and said synchronous switching center reporting to said interworking/interoperability function unit that the handover has been completed;

said mobile terminal switching a vocoder thereof when a predetermined time set in the timer has expired;

switching vocoders between said asynchronous switching center and said synchronous switching center simultaneously with the vocoder switching of the mobile terminal; and releasing the connection between said asynchronous switching center and said radio network controller;

wherein the handover request message includes a handover-related message used in said synchronous communication system, and a parameter including at least one selected from the group consisting of a neighbor cell information, a neighbor base station information, a handover type, a handover cause, a source base station controller ID, a target base station controller ID, RAB information, and radio network-related information of said mobile terminal; and wherein said method further comprises the step of determining whether said handover request is a handover in the asynchronous mobile communication system or a handover to the synchronous mobile communication system, based on the neighbor cell information and a neighbor base station information of said mobile terminal.

2. The method of claim 1, wherein said handover request message, which said asynchronous switching center transmits to said interworking/interoperability function unit, includes an asynchronous identification number (MSISDN) of said mobile terminal.

3. The method of claim 1, wherein the subscriber information, which said interworking/interoperability function unit received from said dual stack home location register, includes synchronous network identifiers (MIN, ESN) of said mobile terminal.

4. The method of claim 1, wherein said interworking/interoperability function unit requests the subscriber information of said mobile terminal from said dual stack home location register by using any one of either a synchronous message or an asynchronous message.

5. The method of claim 1, wherein before transmitting a handover instruction message to said synchronous switching center, said interworking/interoperability function unit generates an ID information of the synchronous switching center to be connected to said asynchronous switching center to include the ID information into the handover instruction message, and transmits the handover instruction message including an internal switching center circuit ID (InterMSCCircuitID) for each handover interval.

6. The method of claim 1, wherein the handover request message, which said interworking/interoperability function unit transmits to said synchronous switching center, includes a parameter including at least one selected from the group consisting of a billing ID, ESN, an internal switching center circuit ID and MIN, and the response message, which said synchronous switching center transmits to said interworking/interoperability function unit, includes a parameter including at least one selected from the group consisting of CDMA channel data and a CDMA channel list.

7. The method of claim 1, wherein a resource assignment completion message, which said asynchronous switching center reports to said radio network controller, includes at least one selected from the group consisting of a message type, an RRC container, and a RAB list to be released.

8. The method of claim 1, wherein said access signal includes at least one selected from the group consisting of an invoke ID, an application protocol data unit (APDU), and a selected wireless resource information.

9. The method of claim 1, wherein, after the connection between said asynchronous switching center and said radio network controller has been released, a call release request message is transmitted to said interworking/interoperability function unit, and said interworking/interoperability function unit responds thereto so that the trunk set between said asynchronous switching center and said synchronous switching center is released.

10. In a mobile communication system in which an asynchronous mobile communication system and a synchronous mobile communication system co-exist and in which said asynchronous mobile communication system and said synchronous mobile communication system are connected by an interworking/interoperability function unit, a method of handover for minimizing a silent period during a voice call of a dual band dual mode mobile terminal, which is communicable with both said asynchronous mobile communication system and said synchronous mobile communication system, said method comprising the steps of:

an asynchronous switching center of the asynchronous mobile communication system transmitting a handover request message to said interworking/interoperability function unit, and said interworking/interoperability function unit requesting a dual stack home location register to transmit subscriber information of said mobile terminal and receiving said subscriber information;

said interworking/interoperability function unit instructing a handover to a synchronous switching center of said synchronous mobile communication system, and said synchronous switching center requesting a handover to a base station controller/base station of said synchronous mobile communication system;

said base station/base station controller assigning a forward traffic channel to said mobile terminal, and transmitting a response message with respect to the handover request to said synchronous switching center;

said synchronous switching center communicating with said asynchronous switching center via said interworking/interoperability function unit, so that a trunk is set between said asynchronous switching center and said synchronous switching center;

said asynchronous switching center reporting to a radio network controller of said asynchronous mobile communication system that a resource assignment for the handover has been completed;

said radio network controller instructing said mobile terminal to switch to a synchronous connection mode for communication with the synchronous mobile communication system;

said interworking/interoperability function unit transmitting an access signal to said asynchronous switching center;

said mobile terminal transmitting a frame and a preamble to said base station/base station controller through a reverse traffic channel, and reporting that the handover has been completed;

said mobile terminal actuating a timer as the connection to said synchronous mobile communication system has been completed;

said base station/base station controller reporting to said synchronous switching center that the handover has been completed, and said synchronous switching center reporting to said interworking/interoperability function unit that the handover has been completed;

said mobile terminal switching a vocoder thereof when a predetermined time set in the timer has expired;

switching vocoders between said asynchronous switching center and said synchronous switching center simultaneously with the vocoder switching of the mobile terminal; and releasing the connection between said asynchronous switching center and said radio network controller;

wherein, after the connection between said asynchronous switching center and said radio network controller has been released, a call release request message is transmitted to said interworking/interoperability function unit, and said interworking/interoperability function unit responds thereto so that the trunk set between said asynchronous switching center and said synchronous switching center is released;

wherein said call release request message includes a parameter including at least one selected from the group consisting of an internal MSC circuit ID, a release cause, a billing ID and MIN, and wherein a response message from said interworking/interoperability function unit includes a billing ID.

11. In a mobile communication system in which an asynchronous mobile communication system and a synchronous mobile communication system co-exist and in which said asynchronous mobile communication system and said synchronous mobile communication system are connected by an interworking/interoperability function unit, a method of handover for minimizing a silent period during a voice call of a dual band dual mode mobile terminal, which is communicable with both said asynchronous mobile communication system and said synchronous mobile communication system, said method comprising the steps of:

an asynchronous switching center of the asynchronous mobile communication system transmitting a handover request message to said interworking/interoperability function unit, and said interworking/interoperability function unit requesting a dual stack home location register to transmit subscriber information of said mobile terminal and receiving said subscriber information;

said interworking/interoperability function unit instructing said synchronous switching center to perform a handover, and said synchronous switching center requesting a handover to a base station controller/base station of said synchronous mobile communication system;

said base station/base station controller assigning a forward traffic channel to said mobile terminal, and transmitting a response message with respect to the handover request to said synchronous switching center;

said synchronous switching center transmitting a handover instruction response message to said interworking/interoperability function unit, and said interworking/interoperability function unit transmitting a handover request response message to said asynchronous switching center;

said asynchronous switching center transmitting an initial address message to said interworking/interoperability function unit and receiving a response thereto so that a trunk is set between said asynchronous switching center and said synchronous switching center;

said asynchronous switching center reporting to a Node B/radio network controller of said asynchronous mobile communication system that a resource assignment for the handover has been completed;

said Node B/radio network controller instructing said mobile terminal to perform a handover so that said mobile terminal is switched to a synchronous connection mode for communication with the synchronous mobile communication system;

said interworking/interoperability function unit transmitting an access signal to said asynchronous switching center;

said mobile communication terminal transmitting a frame or a preamble to said base station/base station controller through a reverse traffic channel and reporting that the handover has been completed;

said mobile communication system actuating a timer as the connection to the synchronous mobile communication system has been completed;

said base station/base station controller reporting to said synchronous switching center that the handover has been complete, and said synchronous switching center notifying said interworking/interoperability function unit that the handover has been completed;

said mobile terminal switching a vocoder thereof when a predetermined time set in the timer has expired;

switching vocoders between said asynchronous switching center and said synchronous switching center simultaneously with the vocoder switching of the mobile terminal; and releasing the connection between said asynchronous switching center and said Node B/radio network controller;

wherein the handover request message transmitted from said Node B/radio network controller to said asynchronous switching center includes a handover related message used in said synchronous communication system, and a parameter including at least one selected from the group consisting of a neighbor cell information, a neighbor base station information, a handover type, a handover cause, a source base station controller ID, a target base station controller ID, an RAB information, and radio network-related information of said mobile terminal; and wherein said method further comprises the step of said asynchronous switching center determining whether said handover request is a handover in the asynchronous mobile communication system or a handover to the synchronous mobile communication system, with reference to the neighbor cell information and the neighbor base station information of the mobile terminal.

12. The method of claim 11, wherein the trunk is set between said asynchronous switching center and said synchronous switching center by
said asynchronous switching center transmitting the initial address message (IAM) being an ISUP message to said interworking/interoperability function unit, and
said interworking/interoperability function unit transmitting an address complete message being an ISUP message to said asynchronous switching center.

13. The method of claim 11, wherein said step of releasing the connection between said asynchronous switching center and said node B/radio network controller comprising the steps of:
said interworking/interoperability function unit requesting said asynchronous switching center to release the connection, and reporting that said synchronous switching center and said mobile terminal have been connected to each other by using an ISUP message; and
the connection between said asynchronous switching center and said node B/radio network controller being released.

14. The method of claim 11, wherein a handover request from said asynchronous switching center to said interworking/interoperability function unit includes an asynchronous identification number (MSISDN) of said mobile terminal.

15. The method of claim 11, wherein the subscriber information, which said interworking/interoperability handler received from said dual stack home location register, includes synchronous identifiers (MIN, ESN) of said mobile terminal.

16. The method of claim 11, wherein said interworking/interoperability function unit requests the subscriber information of said mobile terminal from said dual stack home location register by using any one of either a synchronous message or an asynchronous message.

17. The method of claim 11, wherein before transmitting a handover instruction message to said synchronous switching center, said interworking/interoperability function unit generates the ID information of the synchronous switching center to be connected to said asynchronous switching center to include the ID information into the handover instruction message, and transmits the handover instruction message including an internal switching center circuit ID (InterMSCCircuitID) for each handover interval.

18. The method of claim 11, wherein
the handover request message, which said interworking/interoperability function unit transmits to said synchronous switching center, includes a parameter including at least one selected from the group consisting of a billing ID, ESN, an internal switching center circuit ID and MIN, and
the response message, which said synchronous switching center transmits to said interworking/interoperability function unit, includes a parameter including at least one selected from the group consisting of a CDMA channel data and a CDMA channel list.

19. The method of claim 11, wherein a resource assignment completion message, which said asynchronous switching center reports to said node B/radio network controller, includes at least one selected from the group consisting of a message type, an RRC container, and an RAB list to be released.

20. The method of claim 11, wherein said access signal includes at least one selected from the group consisting of an invoke ID, an application protocol data unit (APDU), and a selected wireless resource information.

21. The method of claim 11, further comprising, after the connection between said asynchronous switching center and said node B/radio network controller has been released, the steps of:
as a call release request message is transmitted to said interworking/interoperability function unit, said interworking/interoperability function unit transmitting said call release request message to the switching center, which did not request a call release, and
as the switching center, which received said call release request message, transmits a response message to said interworking/interoperability function unit, the trunk set between said asynchronous switching center and said synchronous switching center is released.

22. The method of claim 21, wherein
said call release request message includes a parameter including at least one selected from the group consisting of an internal MSC circuit ID, release causes, a billing ID and MIN, and
said response message transmitted to said interworking/interoperability function unit includes a billing ID.

23. In a mobile communication system in which an asynchronous mobile communication system and a synchronous mobile communication system co-exist and in which said asynchronous mobile communication system and said synchronous mobile communication system are connected by an interworking/interoperability function unit, a method of handover for minimizing a silent period during a voice call of a dual band dual mode mobile terminal, which is communicable with both said asynchronous mobile communication system and said synchronous mobile communication system, said method comprising the steps of:
an asynchronous switching center of the asynchronous mobile communication system transmitting a handover request message to said interworking/interoperability function unit, and said interworking/interoperability function unit requesting a dual stack home location register to transmit subscriber information of said mobile terminal and receiving said subscriber information;
said interworking/interoperability function unit instructing said synchronous switching center to perform a handover, and said synchronous switching center requesting a handover to a base station controller/base station of said synchronous mobile communication system;
said base station/base station controller assigning a forward traffic channel to said mobile terminal, and transmitting a response message with respect to the handover request to said synchronous switching center;
said synchronous switching center transmitting a handover instruction response message to said interworking/interoperability function unit, and said interworking/interoperability function unit transmitting a handover request response message to said asynchronous switching center;
said asynchronous switching center transmitting an initial address message to said interworking/interoperability function unit and receiving a response thereto so that a trunk is set between said asynchronous switching center and said synchronous switching center;
said asynchronous switching center reporting to a Node B/radio network controller of said asynchronous mobile communication system that a resource assignment for the handover has been completed;
said Node B/radio network controller instructing said mobile terminal to perform a handover so that said mobile terminal is switched to a synchronous connection mode for communication with the synchronous mobile communication system;

said interworking/interoperability function unit transmitting an access signal to said asynchronous switching center;

said mobile communication terminal transmitting a frame or a preamble to said base station/base station controller through a reverse traffic channel and reporting that the handover has been completed;

said mobile communication system actuating a timer as the connection to the synchronous mobile communication system has been completed;

said base station/base station controller reporting to said synchronous switching center that the handover has been complete, and said synchronous switching center notifying said interworking/interoperability function unit that the handover has been completed;

said mobile terminal switching a vocoder thereof when a predetermined time set in the timer has expired;

switching vocoders between said asynchronous switching center and said synchronous switching center simultaneously with the vocoder switching of the mobile terminal; and releasing the connection between said asynchronous switching center and said Node B/radio network controller;

wherein, after the connection between said asynchronous switching center and said node B/radio network controller has been released, said method further comprises the steps of:

releasing a call between said asynchronous switching center and said synchronous switching center as the mobile terminal in the asynchronous mobile communication system area releases a call; and as said asynchronous switching center reports to said interworking/interoperability function unit that the connection between said asynchronous switching center and said node B/radio network controller has been released, said interworking/interoperability function unit transmitting a call release request message to said synchronous switching center, and said synchronous switching center responding to said call release request message so that said trunk set between said asynchronous switching center and said synchronous switching center is released.

24. The method according to claim 23, wherein said call release request message includes a parameter including at least one selected from the group consisting of an internal MSC circuit ID, a release cause, a billing ID and MIN, and a response message transmitted from said synchronous switching center to said interworking/interoperability function unit includes a billing ID.

* * * * *